INVENTOR.

Willard C. Macfarland

BY

Robert D. Silver

June 12, 1962 W. C. MacFARLAND 3,038,346

TUNING DEVICE

Filed Nov. 28, 1960 2 Sheets-Sheet 2

INVENTOR.
Willard C. Macfarland
BY
Robert D. Silver

United States Patent Office 3,038,346

Patented June 12, 1962

3,038,346

TUNING DEVICE

Willard C. MacFarland, Northbrook, Ill., assignor to Illinois Tool Works, Inc., a corporation of Delaware Filed Nov. 28, 1960, Ser. No. 72,142

11 Claims. (Cl. 74—10.85)

This invention relates in general to tuning devices and more particularly relates to a novel assembly to provide accurate backlash free tuning for devices such as are used in television, radio sets and the like.

It has long been desired to have a simple tuning assembly which will provide tuning free of backlash at an economical cost. Backlash free tuning devices have heretofore required exceptionally close tolerances, cumbersome assemblies and very special bearing means in order to provide the desired function. It is a general object of this invention to provide a backlash free tuning device which is simple in design and very economical in cost.

It is a further object of this invention to provide a backlash free tuning device which is readily installed with and made a part of a larger unit.

It is a further object of this invention to provide a backlash free tuner which utilizes gearing wherein there is constant tooth contact on both forward and rearward movement of the gear and pinion.

It is a further object of this invention to provide a spring loaded gear and pinion unit which is exceedingly economical in cost and utilizes readily available biasing means in the form of resilient washers.

It is another object of this invention to provide a novel mounting bracket which may be extruded from aluminum or other like material in an economical manner to provide spaced sub-portions, which sub-portions in turn are spaced to provide ample bearing points to give accurate backlash free tuning.

It is another object of this invention to provide a tuning device which may be readily assembled by non-skilled labor and which is adapted, by reason of its configuration to provide a take off of the output motion in both directions parallel to the axis of the face gear used.

The novel features that are characteristic of the invention are set forth with particularity in the appended claims. The invention itself, however, both as to its organization and its method of operation, together with additional objects and advantages thereof, will best be understood by the following description of the specific embodiments when read in conjunction with the accompanying drawings in which:

Figures 1, 5:
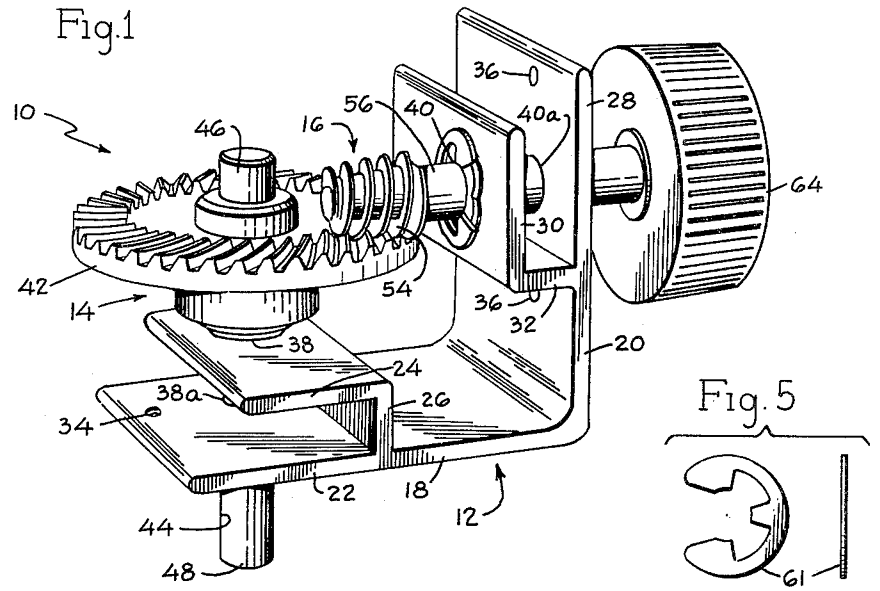
FIGURE 1 is an isometric perspective view of the tuner assembly.
FIGURE 5 is a detached view of a stop means employed in the assembly shown in FIGURES 1–4.
Figure 2:
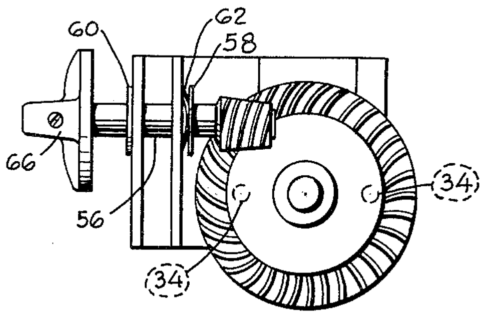
FIGURE 2 is a top view of the assembly shown in FIGURE 1, the assembly being rotated approximately 170°.

Returning now to the drawings, a tuner assembly 10 is shown which may form a sub-assembly for a larger device such as a radio, television set, or other equipment requiring precise tuning. It essentially comprises a bracket means 12, face gear means 14 and pinion gear means 16. The bracket means 12 is comprised of a pair of angularly disposed first and second bracket members 18 and 20 respectively which are at right angles to each other, substantially as shown. The first bracket member 18 has a pair of sub-portions 22 and 24 which are spaced from each other by an integral web portion 26, whereas the second bracket member 20 has the substantially identical spaced first and second sub-portions 28 and 30 connected by a second web portion 32. It will be noted that spaced bracket sub-portion 24 is shorter than bracket sub-portion 22 whereby clearance is provided for one of the pair of mounting holes 34, the length of the sub-portion 30 permitting access to the mounting holes 36 which are disposed on the second bracket portion 20 for mounting that portion of the bracket to another portion of the chassis assembly. Each of the sub-portions 22 and 24 of the first bracket member 18 has bore means 38 and **38*a* respectively which are aligned and are adapted to receive the shaft 44 which carries the face gear element 42. The second bracket portion 20 and the sub-portions 28 and 30 are provided with aligned bores 40 and 40*a* respectively, the axis of said aligned bores being angularly arranged to the axis of the aligned bores 38 and 38*a*** in non-intersecting relationship.

In the embodiment shown in FIGS. 1 through 4 the bores 38, **38*a*, 40 and 40*a*, the shafts 44 and 56 are of the same diameter so that the pinion means 16 and gear means 14** may be interchangeably mounted on either. It will be apparent that this relationship greatly facilitates assembly techniques by non-skilled labor.

Figure 3:
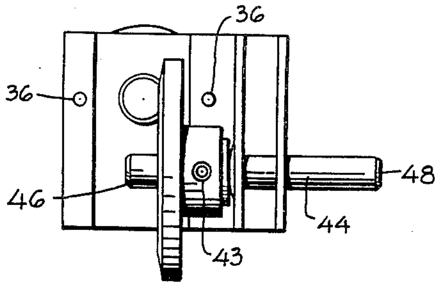
FIGURE 3 is an end view of the assembly shown in FIGURE 2.
Figure 4:
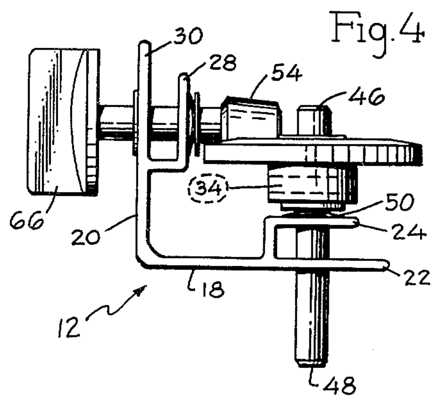
FIGURE 4 is a side view of the assembly depicted in FIGURE 2.

The gear means 14 essentially comprises a molded plastic gear portion 42 and its shaft portion 44. The shaft portion as shown is metallic, the gear means 14 being keyed thereto by a suitable tubular rivet member 43 as shown in FIGURE 3 of the drawings. It will be appreciated that the face gear 42 may be keyed to shaft 44 by any suitable means, as for that matter might be integrally formed with a solid shaft if desired as shown in later embodiments.

The particular configuration of the teeth on the face gear 42 is preferably that which is taught in U.S. Patent 2,696,125 issuing December 7, 1954 as invented by Oliver E. Saari. The gear can be hobbed by techniques set forth in Saari Patent No. 2,731,886, can be made by die casting or powdered metallurgy techniques after a suitable mold has been made, or can be made from plastic materials by hobbing or conventional molding techniques. The structure of the gear lends itself particularly well to molding techniques because the draft angles involved prove to be no problem. In the instant situation, a gear made from a material sold under the name "Nylon" has proven itself to work well for the intended purpose.

By utilizing a face gear of the aforementioned characteristics, I have found that it is possible to have both ends (46 and 48) of the shaft 44 of the gear available for the power takeoff for the tuner. By first assembling the gear member 42 upon the shaft 44, the entire gear and shaft unit may then be placed into the bore 38. A first biasing means 50 in the form of a resilient washer 52 is disposed on the shaft 44 intermediate the gear 42 and bracket sub-portion 24.

Figure 6:
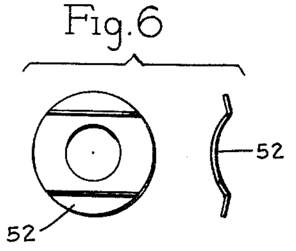
FIGURE 6 is a detached view of the resilient biasing means in the form of a spring washer as used in the assembly shown in FIGURES 1–4.

The pinion which mates with the gear 42 is preferably formed in a manner and has the configuration as set forth in the two United States patents previously referred to. The pinion includes a pinion gear 54 with an integral shaft 56, the latter to be mounted in the bores 40 and 40*a* of the second bracket portion 20. The shaft 56 is formed with a pair of grooves or spaced shoulders which are spaced so that they are located on opposite sides of the two sub-portions 28 and 30 of the bracket member when considered as a unit, a pair of shaft retainer means 58 and 60, having a configuration 61 as shown in FIGURE 5, being inserted in said grooves or shoulders of the pinion. A second biasing means 62, similar to biasing means 52 (as shown in FIGURE 6) is interposed between the outboard stop means 58 and the adjacent surface of bracket sub-portion 30.

A manually engageable knob means 64 may be placed on the outboard end of the pinion shaft 56 and may be of typical form as exemplified in FIGURE 1 and/or as shown in FIGURES 2 through 9. It is, of course, obvious that any form of assembly of manually engageable knob means may be used with the sub-assembly 10.

To assemble the tuner assembly 10, the pinion means 16 is first assembled with the stop ring 58 and resilient washer 62 and is then inserted through the bores in sub-portions 30 and 28 whereupon the stop ring means 60 is inserted to firmly hold the pinion in place. The knob means 64 and 66 is assembled to the end of the pinion. The shaft member 44 is placed in bore 38 in the first bracket member 18, the gear portion 42 being forced over the shaft 44 and keyed thereto by the key 43.

The first and second biasing means tend to constantly load the face gear means 42 and pinion means 16 into engagement such that there is constant tooth engagement within a wide range of tolerances and over a wide wearing range. The wear factor in the instant situation is not of great consequence due to the fact that tuning mechanisms are not generally subjected to hard load usage. Due to the configuration of the pinion and gear means together with the biasing means, there is always constant tooth contact which is backlash free on repeated reversal of rotation of the pinion.

Further, it will be apparent that bracket means 12 may be conveniently extruded from aluminum which is then cut off to size, the bores and mounting holes therein being useable for either the gear or pinion assembly. By use of the web portions 32 and 26, the bracket sub-portions 24 and 30 may be made smaller than spaced parallel sub-portions 28 and 22 respectively, which permits easy access to the mounting holes as well as providing spaced points for a stable bearing. The utilization of the bracket means, the particular type of pinion and gear means, and the biasing means, all combine to provide an exceptionally simple, high precision, backlash free, economical tuning device.

Figures 7, 8, 9:
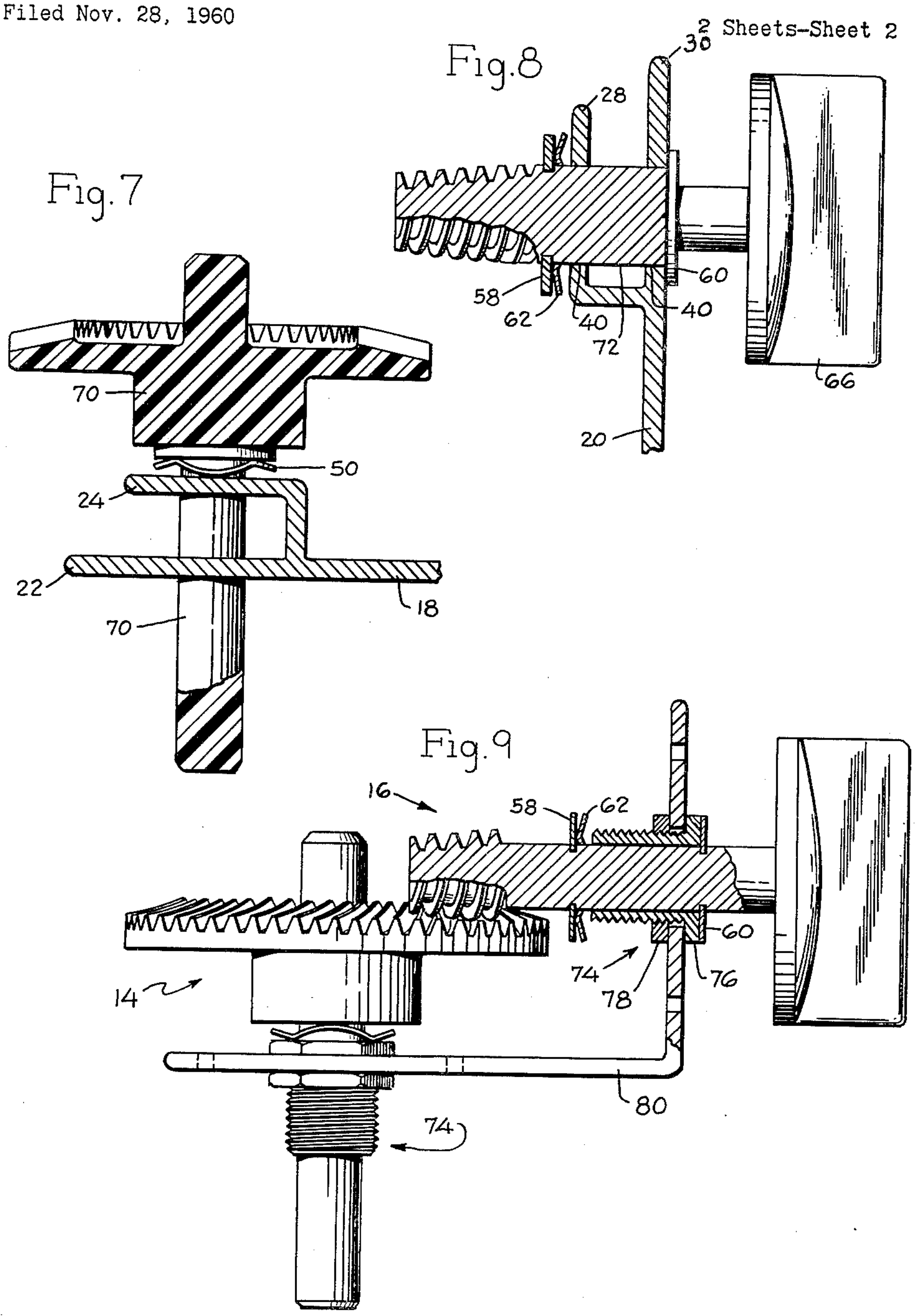
FIGURE 7 is a view, partially in section, showing an alternative embodiment of a portion of the assembly shown in FIGURE 1.
FIGURE 8 is an alternative embodiment of a pinion means designed to be associated with the gear means shown in FIGURE 7.
FIGURE 9 is a view of another alternative embodiment of the assembly shown in FIGURES 1–4 illustrating an alternate method of mounting the components.

The embodiment shown in FIGURES 7 and 8 are substantially similar to that shown in FIGURES 1 to 6, and substantially similar parts have been given identical reference numerals therein. FIGURES 7 and 8 show the portions of the assembly in somewhat detached relation so that a better sectional view thereof may be had. The face gear means 14 of FIGURE 7 utilizes an integral plastic shaft and face gear 70 which may be molded as a single unit to a configuration similar to face gear means 14 shown in FIGURES 1 to 6. Due to the overall configuration of the assembly, when a unitary member 70 is used, it will be apparent that this member must be assembled first in contradistinction to the assemblies shown in FIGURES 1 through 6. To cooperate with member 70, a slightly different form of pinion shaft must be provided, i.e., the shaft portion 72 must be of a diameter which is at least as large as the largest diameter of the pinion gear portion per se. This, of course, necessitates a slightly larger bore 30 which permits the pinion to be inserted through the bracket portion 20 during assembly. The depressing of the face gear means 14 against the washer 50, permits the pinion teeth to fit over the teeth of the face gear 42 per se. After insertion of the pinion, as shown in FIGURE 8, the stop means 58 and the resilient second biasing means 62 may be assembled to the pinion shaft.

In the third embodiment shown in FIGURE 9, the face gear means 14 may be of either the types shown in FIGURES 1 through 6 or the types shown in FIGURE 7. The essential difference in the embodiment shown in FIGURE 9 relates to the novel bearing means 74 which may be utilized with a modified bracket 80. More particularly the bracket 80 may take the form of a simple right angle metallic member having mounting holes therein, and the bearing means comprises a hollow tubular member 76 having an enlarged head and an elongated cylindrical shank having a threaded outside wall. The tubular member 76 is held in place in the bores 38 and 40 by a suitable nut 78. In all other respects the assembly is essentially as aforedescribed. The length of the tubular member 76 is such that it provides sufficient bearing area for the respective shafts so that the shafts when biased by the first and second biasing means will still give high precision backlash free tuning action.

Although the specific embodiments have been shown and described, it is with full awareness that many modifications thereof are possible. The invention, therefore, is not to be restricted except in so far as is necessitated by the prior art and by the spirit of the appended claims.

What is claimed as the invention is as follows:

1. A tuner assembly comprising bracket means having first and second portions disposed at substantially right angles to each other, each of said bracket portions provided with bores having an axis angularly arranged to each other in skewed relation, gear means comprising a face gear portion and a shaft portion extending axially beyond each side of said face gear portion to provide two potential output take-off portions in the vicinity of the terminal ends thereof, said shaft portion being mounted in the bore of said first bracket portion, first biasing means located intermediate and engaging said first bracket portion and said face gear means biasing the latter away from said first bracket portion, pinion means comprised of a pinion shaft portion and a pinion gear portion mounted for movement therewith, said pinion shaft portion being mounted in the bore of said second bracket portion so that the axis thereof is in non-intersecting relation to the axis of said shaft portion of said gear means, said pinion gear portion being disposed in motion transmitting engagement with teeth provided on the face gear portion of said gear means, and second biasing means disposed intermediate said second bracket portion and said pinion gear portion and biasing the latter into engagement with the teeth of said face gear portion of said gear means, said first and second biasing means jointly providing a loaded gear set which is free from backlash on repeated reversals of movement of said pinion shaft means whereby accurate movement of said output portions of said gear shaft portion is provided.

2. The tuner assembly set forth in claim 1 wherein the toothed face gear portion of the gear means is formed of moulded plastic material.

3. The tuner assembly set forth in claim 1 wherein the first and second biasing means each are in the form of resilient washers surroundingly disposed to said gear shaft portion and said pinion shaft portion respectively.

4. The tuner assembly set forth in claim 1 wherein said first and second bracket portions each comprise integral spaced parallel sub-portions to provide spaced elongated bearing surfaces for said shaft portions, one of the sub portions of each bracket portions having a dimension less than the dimension of the other sub-portion and mounting holes for the bracket means disposed on the longer sub portions.

5. The tuner assembly set forth in claim 1 wherein stop means is associated with said pinion shaft portion and said second bracket portion, said stop means being engageable with said second bracket portion on the side opposite of the location and engagement of said second biasing means to limit the axial movement of said pinion shaft portion by said second biasing means.

6. The tuner assembly set forth in claim 1 wherein the gear means comprising the shaft portion and the face gear portion are of an integral piece moulded plastic construction.

7. The tuner assembly set forth in claim 1 wherein said first and second bracket portions include threaded hollow tubular bearing insert means having an axial length substantially longer than the depth of the bores of said bracket portions and disposed therewithin.

8. The tuner assembly set forth in claim 4 wherein the bore in sub-portions of said second bracket portion is at least as great in diameter as the largest diameter of said pinion gear portion to permit insertion of said pinion gear portion therethrough.

9. For a tuner assembly, one piece integral bracket means of extruded material and characterized as having first and second portions disposed at substantially right angles to each other, said first bracket portion being formed with first and second parallel bracket sub-portions connected together with a first integral web portion, said first bracket portion and said first bracket sub-portion being formed with mounting holes, said second bracket portion being formed with third and fourth parallel sub-portions connected together with a second integral web portion, said second bracket portion and said third bracket sub-portion each being formed with mounting holes, and first and second through bore means formed in said first and second bracket sub-portions and said third and fourth bracket sub-portion respectively, said first and second bore means each having an axis angularly disposed to the other in skew relationship.

10. The bracket means set forth in claim 9 wherein said second and fourth bracket sub-portions are disposed within the included angle formed by said first and second bracket portions and each have a length dimension, respectively, less than said first and third bracket sub-portions whereby access is had to said mounting holes in said first and third bracket sub-portions.

11. The bracket means set forth in claim 10 wherein said first and third bracket sub-portions are in the same plane as said first and second bracket portions respectively and said first and second web portions are disposed at substantially right angles thereto.

References Cited in the file of this patent

UNITED STATES PATENTS

| | | |
|---|---|---|
| 2,106,088 | De Tar | Jan. 18, 1938 |
| 2,203,292 | Best | June 4, 1940 |
| 2,880,625 | Thomas | Apr. 7, 1959 |
| 2,908,353 | Isaacs et al. | Oct. 13, 1959 |

FOREIGN PATENTS

| | | |
|---|---|---|
| 376,510 | Great Britain | July 14, 1932 |